Fig. 1

INVENTOR.
Albert A. Levenson, Jr.,

Fig. 5.

United States Patent Office 3,419,453
Patented Dec. 31, 1968

3,419,453
MACHINE FOR FORMING CONTAINERS FROM THERMOPLASTIC WEBS OR TUBING
Albert A. Levenson, Jr., Worth, Ill., assignor to Continental Can Company, Inc., New York, N.Y., a corporation of New York
Filed Dec. 27, 1963, Ser. No. 333,846
18 Claims. (Cl. 156—513)

ABSTRACT OF THE DISCLOSURE

A bag fabricating machine which comprises a means for advancing a flattened tubular web between opposed runs of horizontally disposed endless chain conveyors which carry co-operating transversely extending sealing bars and gripper bars, the latter being operated to hold bag forming sections of the web between longitudinally spaced points and also to grip the same intermediate such points and advance portions of each bag section so as to relieve longitudinal tension in said portions while the seals are formed therein by the sealing bars. The machine includes mechanism for perforating the bag material at longitudinally spaced intervals and a flying splice apparatus.

---

This invention relates to container making machines and is more particularly concerned with improvements in a machine for fabricating containers or bags from a continuous strip or web of flexible thermoplastic film materials.

Machinery has been heretofore provided for producing successive flattened containers from thermoplastic films or like materials by heat sealing a flattened thermoplastic tube along spaced transverse lines while the flattened tube is advanced, usually under a certain amount of tension. It has been found that many of the container units formed in this manner are defective because a satisfactory transverse seal is not obtained. It is an object of the present invention, therefore, to provide a machine of this character which will form successive containers by applying a transverse seal at longitudinally spaced intervals to a flattened tube in a manner which provides a more satisfactory sealing of the tube so as to reduce to a minimum the number of defective units due to improper sealing.

It is a more specific object of the invention to provide a container forming machine wherein successive containers are formed from a flattened plastic tube by applying transverse seals at spaced intervals along the length of the tube with the tube being advanced so that longitudinal tension in the tube is relieved while the heat seal is being formed along the transverse seal line.

It is another object of the invention to provide a machine for forming a succession of containers from a flattened tube of thermoplastic material by transversely sealing the tube at longitudinally spaced intervals wherein the tube is advanced between pairs of transverse sealing irons and the longitudinal tension in the tube is relaxed in the areas in which the transverse seals are made while the sealing irons are closed on the tube for effecting the seals.

It is a further object of the invention to provide a container forming machine which comprises a pair of parallel endless conveyors having mounted in longitudinally spaced relation thereon co-operating transverse sealing bars which are adapted to engage in sealing relation on opposite sides of a length of flattened tubing and mechanism associated with the conveyors and the sealing bars for relieving the tension in the tube while the seal is being effected.

It is another object of the invention to provide a container fabricating machine comprising pairs of longitudinally extending, parallel endless conveyors arranged in vertical alignment with the upper and lower runs of the respective lower and upper conveyors of each pair being in opposed relation and co-operating gripper means and sealing means arranged in longitudinally spaced relation on the respective conveyors which are adapted to engage in gripping and sealing relation on opposite sides of flattened tubing, together with mechanism which is operative on the gripper means for shifting portions of the gripper means relative to adjoining portions thereof so as to relieve the tension in the tube in the area in which the sealing means is effective while the seal is formed.

It is a still further object of the invention to provide in a machine of the character described, upper and lower conveyors arranged with opposed runs and having transversely extending gripper bars for engaging on opposite sides of a continuous web of flexible thermoplastic film material, mechanism for transversely perforating the material at longitudinally spaced intervals and for feeding the perforated web between the opposed runs of the conveyors, pairs of co-operating gripper bars fixed in spaced, transversely extending relation longitudinally of the conveyors for engaging on opposite sides of the web, pairs of co-operating, transversely extending gripper rollers rotatably mounted between the gripper bars for also engaging on opposite sides of the web, means for rotating the gripper rollers while the conveyors are advancing so as to advance leading portions of the bag forming sections of the web which are held between adjacent pairs of gripper bars relative to the remaining portions of the bag sections and thereby relieve the tension in the web between the gripper rollers and the gripper bars which are disposed immediately ahead of the rollers, and pairs of co-operating, transversely extending sealing bars arranged to engage with the web in the areas of relieved tension for effecting successive transverse seals.

It is a further object of the invention to provide in a machine of the type described a web splicing mechanism which operates, without interrupting the operation of the machine, automatically to connect the leading end of a new roll of web material to the trailing end of a web on an old roll while the latter is unwinding and before the trailing end passes through the splicing mechanism.

These and other objects and advantages of the invention will be apparent from a consideration of the bag fabricating apparatus which is shown by way of illustration in the accompanying drawings wherein:

Figure 1:
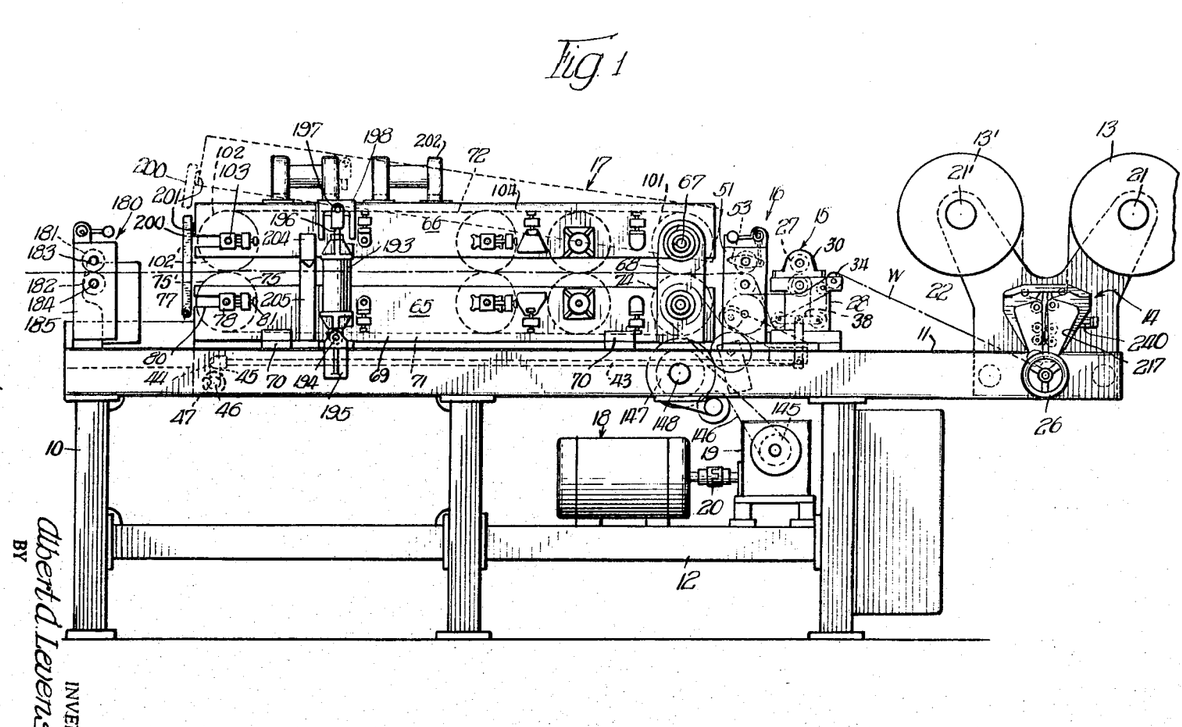
FIGURE 1 is a front side elevation of a container fabricating machine which incorporates therein the principal features of the invention, with portions of the machine broken away or omitted and with other portions shown schematically.
Figure 2:
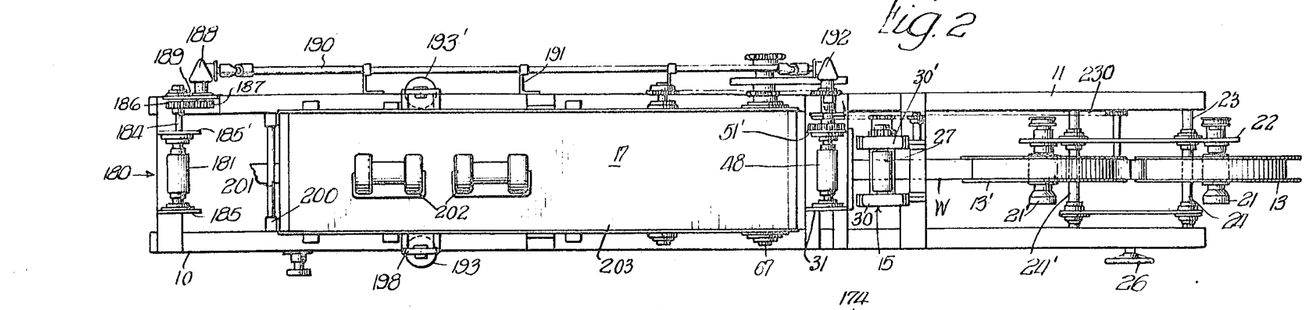
FIGURE 2 is a plan view of the machine as shown in FIGURE 1, with portions broken away or omitted.
Figure 3:
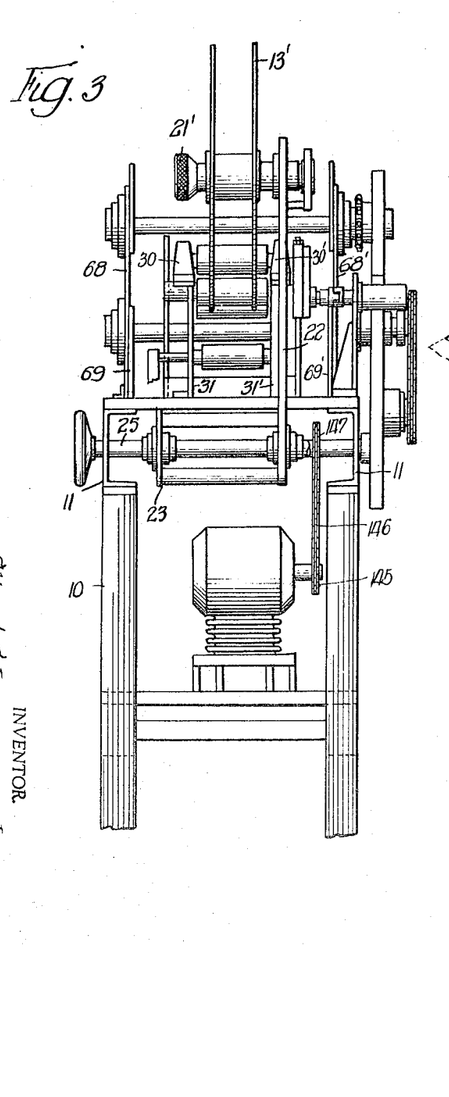
FIGURE 3 is an elevation at the tube feeding end of the machine, to an enlarged scale, and with portions omitted or broken away.

Referring to FIGURES 1 and 2 of the drawings, there is illustrated a supporting frame structure 10 which includes side, end and cross frame members arranged to provide a horizontally disposed, table-like top frame 11 and a bottom frame 12 also horizontally disposed beneath the top frame 11. The top frame 11 is provided with a supporting structure at one end for a pair of reels 13 and 13' providing a supply of flattened tubular bag forming material and a splice forming mechanism 14. The top frame 11 also supports a web perforating mechanism 15, a web feeding mechanism 16 and a horizontally disposed sealing mechanism 17 arranged in the order named. The bottom frame 12 supports a motor 18 and a speed reducing mechanism 19 which is driven from the motor 18 by connecting shaft 20 and which has a driving connection with the perforating, feeding and sealing mechanisms 15, 16 and 17 for operating the same in timed relation.

Figure 12:
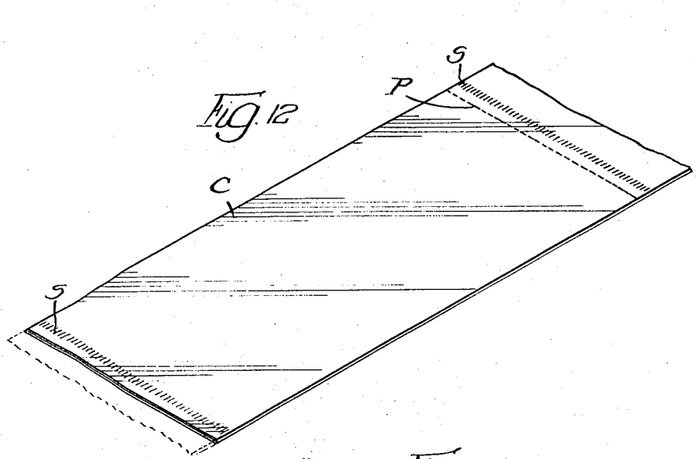
FIGURE 12 is a perspective view of a length of the completed bag material.

The machine is adapted to fabricate from a stock material which is in the form of an endless web W (FIGURES 1 and 2) of relatively flexible, heat sealable flattened tubular material, successive containers C which remain connected, as shown in FIGURE 12, but which may be separated by tearing along transversely disposed perforation lines P adjacent each transverse seam S. The stock material is supplied on reels 13 and 13' in the form of a web W and the lines of perforations P and the transverse seams or seals S are applied by the instant machine. The stock material, or flattened tube, is preferably a transparent film of cellophane, Pliofilm or a like thermoplastic film material and it is preferably supplied as a pre-formed, extruded, seamless tube. However the tube may also be formed from a web of sheet material by longitudinally folding and sealing the same.

The supply reels 13 and 13' (FIGURES 1, 2, 3, 10 and 11) for the web material W are supported at the one end of the top frame 11 on cross shafts 21 and 21' extending from two upstanding leg portions on a vertically disposed bracket plate 22 which is connected at its lower margins to a small support frame 23 which is in turn supported within the frame 11 for adjustable sliding movement laterally of the frame 11 on a pair of parallel cross rods 24 and 24'. An adjusting shaft 25 has a threaded connection with the support frame 23 and a hand wheel 26 to facilitate adjustment for different widths of stock material W. The web W passes first through the flying splice mechanism 14, which will be hereinafter described. It then advances to the perforating mechanism 15 which is supported on the top frame 11.

The perforating mechanism 15 (FIGURES 1, 2, 3, 8 and 9) comprises a perforator roll 27 having a perforating bar 28. The roll 27 is mounted on a cross shaft 29 which is journaled in a pair of end bearings 30 and 30' mounted on the top edges of upstanding, parallel, laterally spaced side frame plates 31 and 31' forming the main frame of the perforating unit 15. An anvil roller 32 is supported on a cross shaft 33 journaled at its ends in the side frame plates 31 and 31'. The web W enters the perforating mechanism 15 on a guide roller 34 which is supported on the cross shaft 35 journaled in the side plates 31 and 31' and a mechanism is provided for adjusting the location of the line of cross perforations P longitudinally of the web W. The adjusting mechanism comprises a T-shaped supporting frame 36 which is pivoted on a cross shaft 37 journaled in the side plates 31 and 31' and which includes top cross bars 38 and 38' on the ends of which a pair of rollers 39 and 39' are mounted on the cross shafts 40 and 40'. The depending stem forming portion 41 of the T-shaped supporting frame 36 has a pivot member 42 at the lower end which has a threaded aperture for receiving the threaded end of a rod 43 extending lengthwise along the front side of the machine. The rod 43 extends to a point near the discharge end of the machine where it is pivotally connected at 44 to the free end of a lever arm 45 on a cross shaft 46 which is journaled in the frame 11 and which has a knob 47 for manually rotating the shaft 46 so as to tilt the supporting frame 36 and raise or lower the respective rollers 39 and 39'. The web W passes downwardly over the entry roller 34 around the one adjusting roller 39 and upwardly between the anvil roller 32 and the perforating roller 27 and then down and around the other adjusting roller 39' and up to a pair of draw rollers 48 and 49, constituting the principal elements of the web feeding mechanism 16.

The lowermost draw roller 49 (FIGURE 8) of the web feeding mechanism 16 is mounted in relatively fixed position on a cross shaft 50 which is journaled between laterally spaced, parallel side frame plates 51 and 51' upstanding from the frame 11. The uppermost draw roll 48 is mounted on a cross shaft 52 which is journaled in a pair of bearing plates 53 and 53' which are mounted in identical fashion on the inside of the side plates 51 and 51'. Each of the plates 53 and 53' is pivotally connected at one end by pin 54 to its respective side plate and at its opposite end to a pressure applying and release mechanism indicated at 55. The mechanism 55 includes a pair of vertically extending headed pins or bolts 56, each extending upwardly through a bore in a pivot block 57 pivotally connected to the bearing plate, with its threaded upper end seated in a threaded bore in a member 58 which is rotatably carried on a cross shaft 59. The shaft 59 is fixed in members 60 at its ends and the latter are eccentrically mounted for rotation in upstanding bracket members 61 with one of the eccentrics 60 having an operating handle 62. Each hanger bolt 56 carries a compression spring 63 mounted thereon with one end seated on the pivot block 57 and the other end seated against a stop washer and nut 64. The plates 53 and 53' are normally urged in a counterclockwise direction about the pins 54 with the spring 63 under compression and pressure between the draw rolls 48 and 49 being relieved by manual rotation of the handle 62 so as to raise the roller 48 for threading the machine. The rollers 48 and 49 draw the web through the perforating unit 15 and deliver it to the sealing unit 17.

The sealing unit 17 (FIGURES 1 to 5) comprises a lower or bottom frame 65 which is disposed horizontally in fixed position lengthwise of the main support frame 11 and an upper or top frame 66 which is pivotally mounted for rotation on a cross shaft 67 which is journaled at its opposite ends in upstanding support plates 68 and 68' secured at their lower ends to the side frame plates 69 and 69' of the lower support frame 65 at the end of the frame 66 which is adjacent the web feeding mechanism 16. The two frames 65 and 66 carry endless web gripping conveyors 71 and 72 which extend longitudinally of the frames 65 and 66 with the inside runs thereof in oppositely disposed relation.

The lower gripping conveyor 71 comprises laterally spaced, endless chains 73 and 73' which are supported on longitudinally spaced pairs of end sprockets 74, 74' and 75, 75'. The sprockets in turn are carried on transverse shafts 76 and 77. The shaft 76 is journaled in fixed position in the vertically disposed plates 68 and 68' and in the laterally spaced, vertically disposed, longitudinally extending side frame plates 69 and 69' (FIGURE 5) of the lower frame 65 so that it is disposed in vertical alignment with the cross shaft 67 and the sprockets 74 and 74' are fixed thereon. The sprockets 75 and 75' are rotatably mounted on the cross shaft 77 at the opposite end of the conveyor 71. The shaft 77 is fixed in end blocks 78 which are slidingly supported in slots 80 in the side frame members 69 and 69' and each provided with an adjusting screw mechanism 81 for adjusting the tension in the chains 73 and 73'.

The chains 73 and 73' carry a plurality of longitudinally spaced gripper bars 82, each of which is secured to the chains by brackets 83 and 83' and each bar 82 has a peripheral insert 84 of resilient material for gripping the web. The bars 82 carry anti-friction rollers 85 and 85' (FIGURE 5) at opposite ends which ride on longitudinally extending support rails 86 and 86' along the lower run of the conveyor. The conveyor 71 also carries longitudinally spaced gripper rollers 87 which have a middle portion covered with rubber or other resilient material and end shaft forming portions 88 and 88' of reduced cross section which are journaled in bearing forming brackets 90 and 90' secured by the angle brackets 91 and 91' to the chains 73 and 73'. The end shafts 88 and 88' extend beyond the outer ends of the bearings 90 and 90' and have secured thereon lever arms 92 and 92' with cam follower rollers 93 and 93' on the free ends thereof. The cam follower rollers 93 and 93' ride on laterally spaced, elongate cam plates 94 and 94' which are supported by suitable brackets in fixed parallel relation on the frame plates 69 and 69'. Tension springs 95 and 95' are connected at one end to intermediate portions of the lever arms 92 and 92' and at their other ends to bracket members 96 and 96' on the chains 73 and 73' so as to hold the cam follower rollers 93 and 93' on the cam plates 94 and 94'. The gripper rollers 87 and the gripper bars 82 are alternately spaced along the length of the chains 73 and 73'.

The upper chain conveyor 72 comprises a pair of laterally spaced chains 100 and 100' (FIGURES 4 and 5) which are supported on pairs of end sprockets 101, 101' and 102, 102' mounted on the cross shafts 67 and 103 at opposite ends of the vertically disposed, longitudinally extending, laterally spaced side plates 104 and 104' of the frame 66. The sprockets 101 and 101' are secured on the cross shaft 67 which is in fixed position at one end of the frame 66. The sprockets 102 and 102' are rotatably mounted on the shaft 103 at the other end of the frame 66 and the latter is fixed to mounting blocks 104 which are adjustably mounted in the same manner as the lower shaft 78 with like adjusting screw mechanisms. The upper conveyor 72 carries longitudinally spaced gripper bars 106 and longitudinally spaced web gripping rollers 107 which are mounted on the chains 100 and 100' in the same manner as the gripper bars 82 and web gripping rollers 87 on the lower conveyor 71 and which co-operate with the latter in gripping the web W between the same along the opposed runs of the two conveyors. The gripper rollers 107 are the same construction as gripper rollers 87 and are journaled in end bearing brackets 108 and 108' with the latter secured to the chains 100 and 100' by angle brackets 109 and 109'. The rollers 107 have lever arms 110 and 110' at their opposite ends with cam follower rollers 111 and 111' which engage with longitudinally extending cam plates 112 and 112'. The cam plates 112 and 112' are fixed to the frame plates 104 and 104' and extend throughout the length of the path of the chains 100 and 100' and the cam follower rollers 111 and 111' are held against the outer edge of the cam plates 112 and 112' by tension springs 113 and 113' connected at one end to intermediate portions of the arms 110 and 110' and at the other end to bracket members 114 and 114' secured on the chains 100 and 100'.

Figure 4:
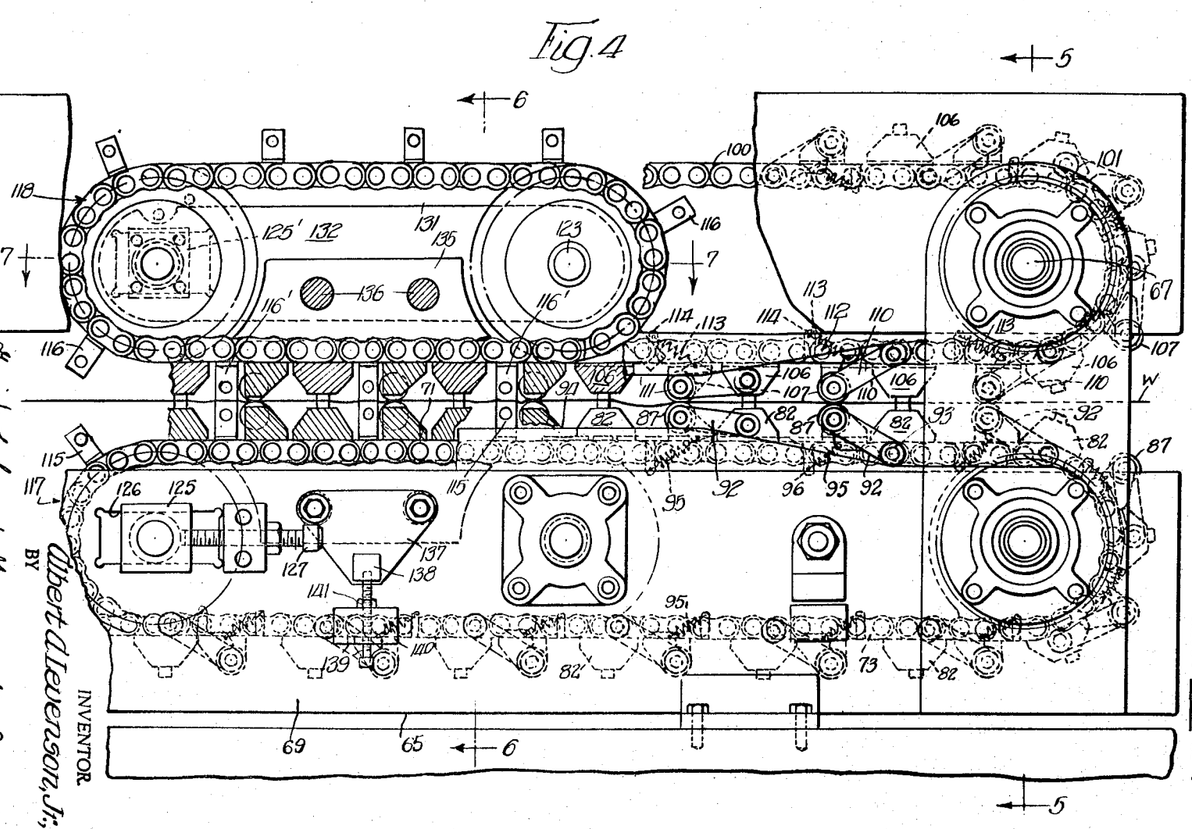
FIGURE 4 is a partial front side elevation showing the web gripping and sealing portion of the machine, to an enlarged scale, and with portions broken away.
Figure 5:
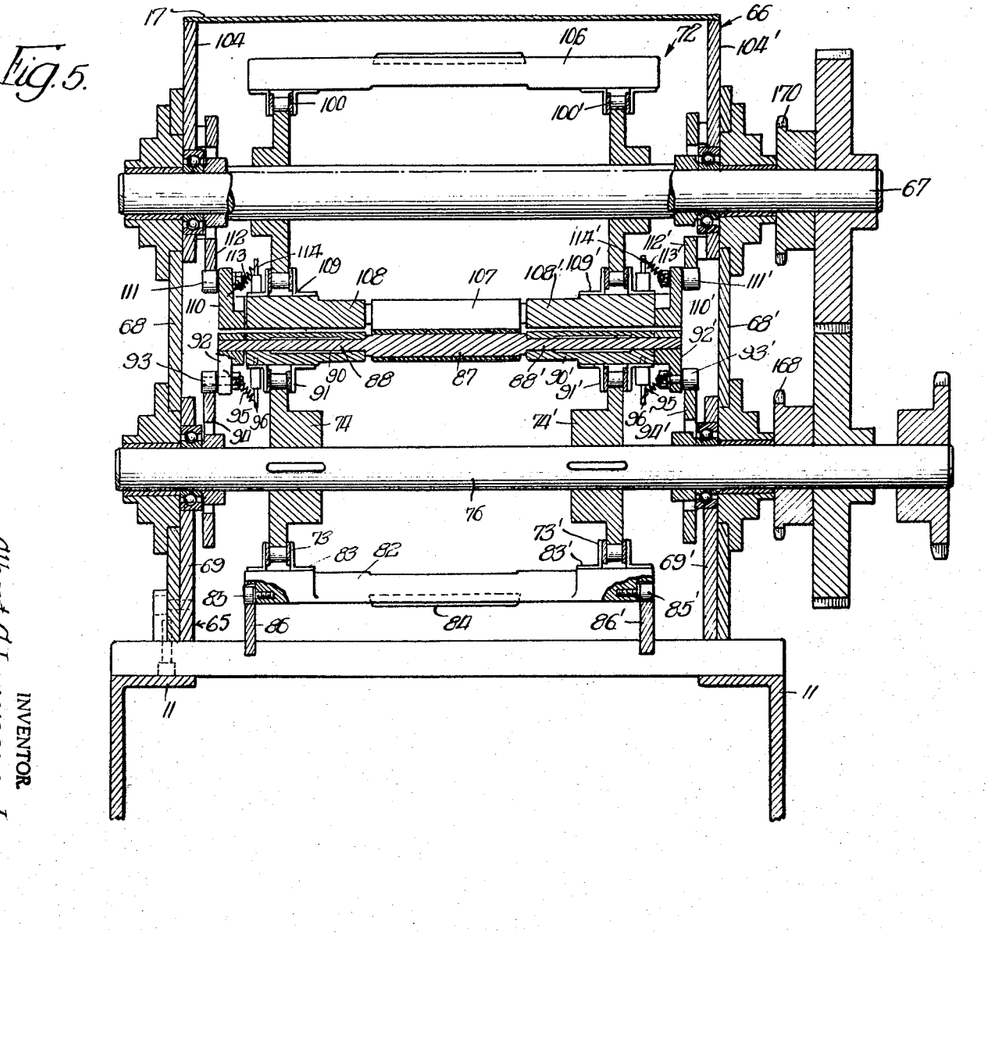
FIGURE 5 is a transverse section taken on the line 5—5 of FIGURE 4.
Figure 6:
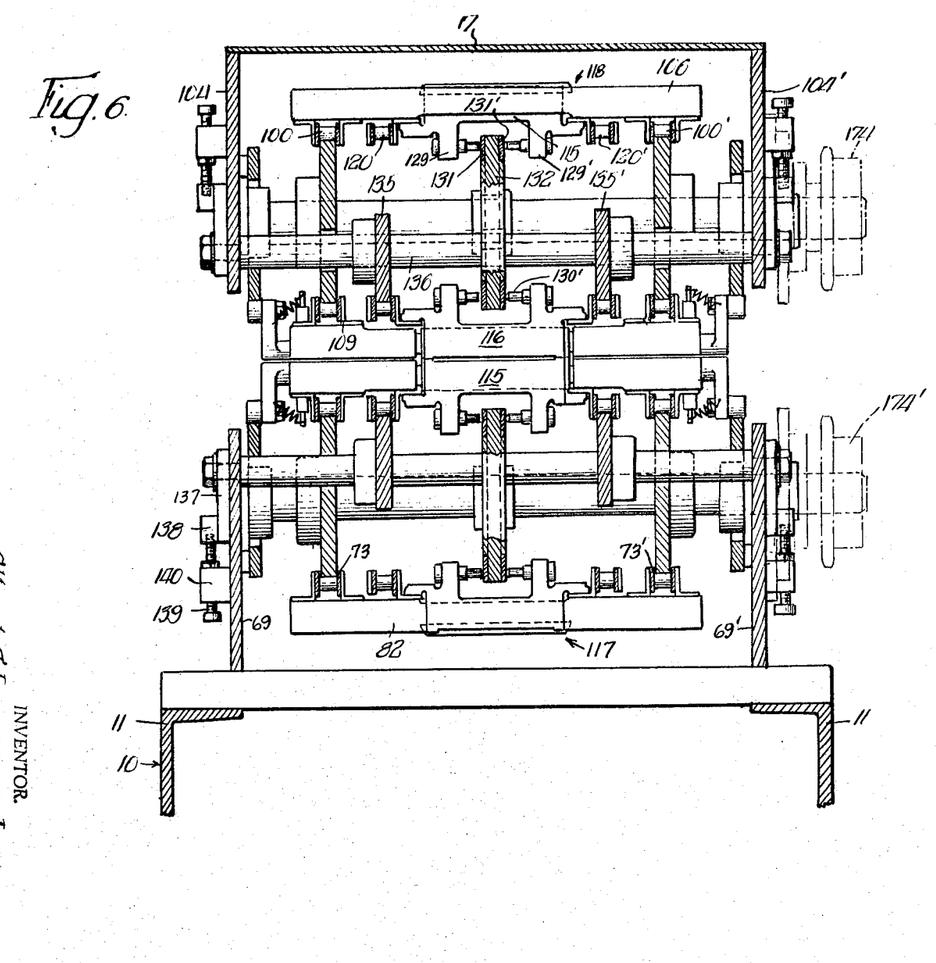
FIGURE 6 is a transverse section taken on the line 6—6 of FIGURE 4.
Figure 7:
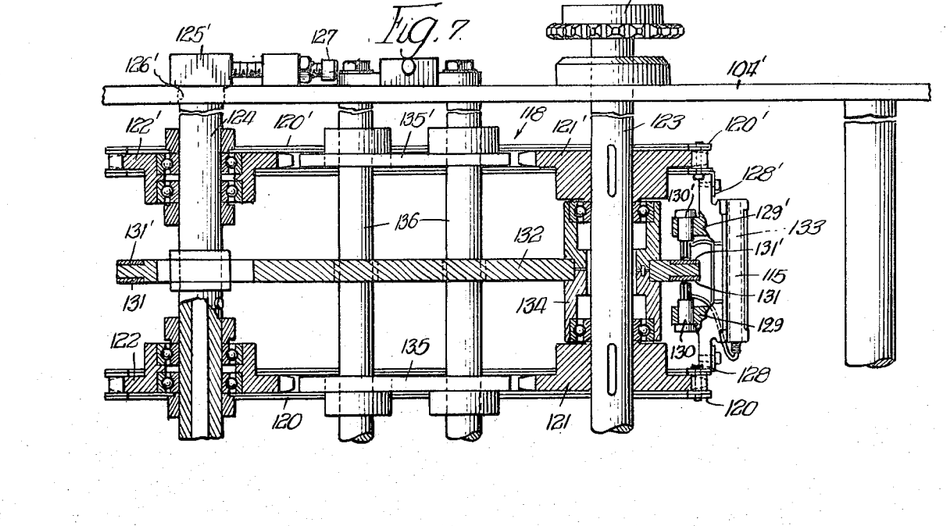
FIGURE 7 is a horizontal section taken on the line 7—7 of FIGURE 4.
Figure 8:
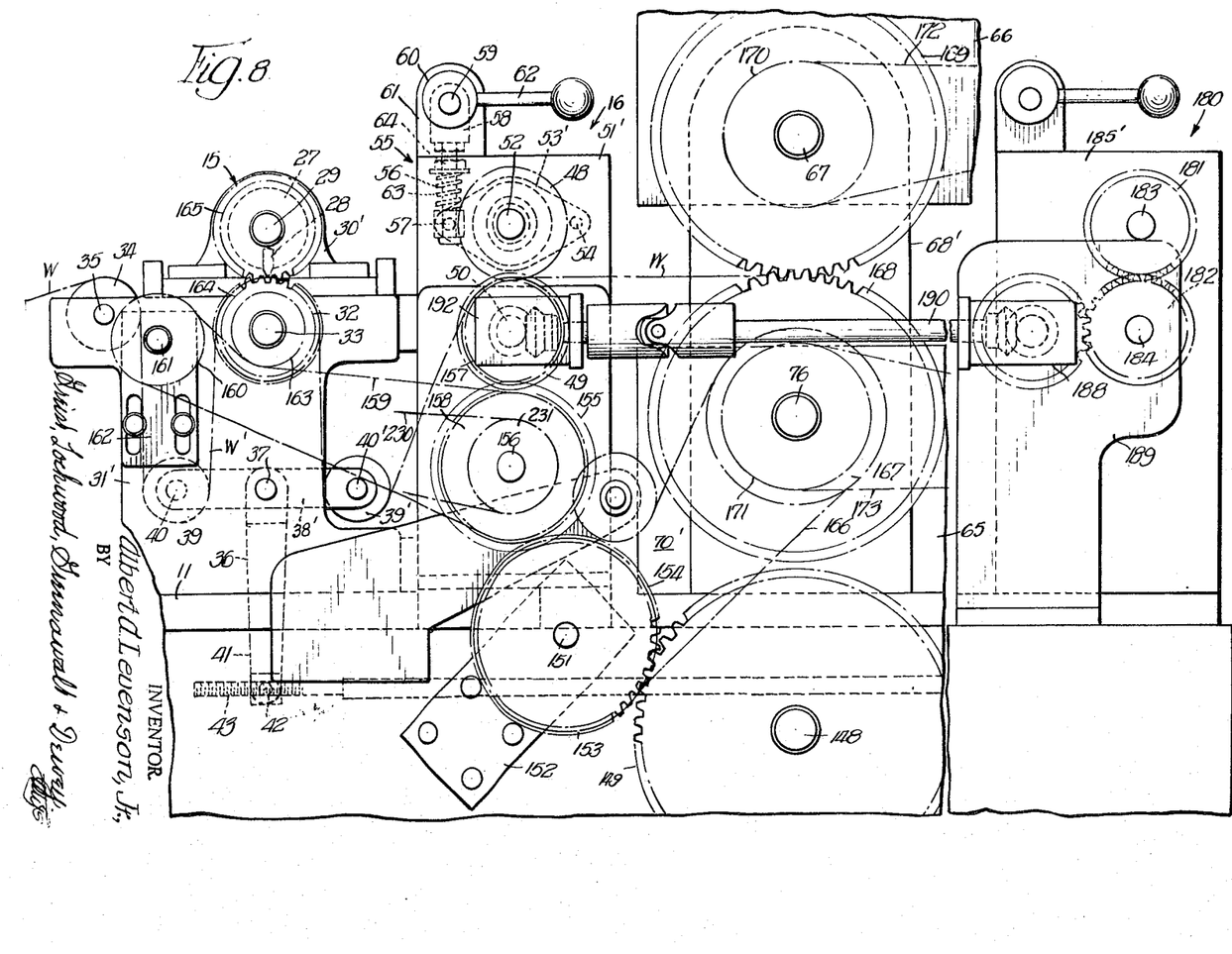
FIGURE 8 is a side elevation at the rear of the machine, with portions broken away.
Figure 9:
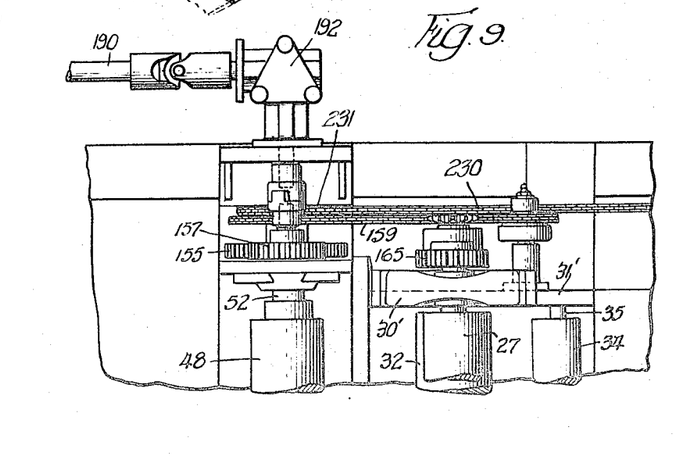
FIGURE 9 is a fragmentary plan view to an enlarged scale.

The co-operating web gripping bars 82 and 106, and the co-operating web gripping rollers 87 and 107 are spaced along the conveyors 71 and 72 according to the length of container being fabricated and so as to accommodate sealing bars 115 and 116 (FIGURES 4, 6 and 7) which are mounted in co-operating relation on lower and upper conveyors 117 and 118 also carried on the lower and upper gripping conveyor frames 65 and 66. The sealing iron conveyor structures 117 and 118 are of identical construction and only the upper one of these structures will be described in detail, it being understood that the lower conveyor 117 is of like construction. The upper sealing conveyor 118 (FIGURES 4, 6 and 7) comprises a pair of laterally spaced chains 120 and 120' which are carried on pairs of longitudinally spaced end sprockets 121, 121' and 122, 122'. The sprockets 121 and 121' at one end are fixed on a transverse shaft 123 journaled in the side plates 104 and 104' (FIGURE 5) of the upper conveyor frame 66. At the other end of the chains 120 and 120' sprockets 122 and 122' are rotatably mounted on the cross shaft 124 which is fixed at its ends in slidably mounted block members 125 and 125' each of which is mounted in a slot 126, 126' in the side plates 104, 104' and provided with a tension adjusting device 127 of the same character as shown for the shaft 78. The bars 115 are connected at opposite ends to the chains 120 and 120' by angle brackets 128 and 128' and each bar 115 is provided with a pair of brush supports 129 and 129' and associated brush assemblies 130 and 130'. The brush assemblies 130 and 130' are arranged in oppositely disposed relation with the brushes positioned to ride on commutator rings 131 and 131' mounted on a vertically disposed supporting plate 132 so as to supply current to heating elements 133 incorporated in the sealing bars 115. The commutator plate 132 is supported at one end on the fixed cross shaft 124 and at the other end on a sleeve 134 mounted on the rotating drive shaft 123, by means of suitable ball bearings. The lower runs of the chains 120 and 120' are supported on the lower edges of adjustably mounted shoe forming, vertically disposed plates 135 and 135' which are supported in laterally spaced relation on a pair of cross rods 136 spaced longitudinally between the chain supporting shafts 123 and 124. The rods 136 are connected at their opposite ends to mechanisms for vertically adjusting their position. The adjusting mechanisms, one of which is shown in FIGURE 4, in connection with the lower sealing conveyor 117, comprise a triangular plate 137 to which the ends of the cross rods 136 are bolted or otherwise secured at the top corners thereof as viewed in FIGURE 4. The plate 137 carries a block 138 at its lower corner with a vertically disposed, threaded bore which receives the end of an adjusting screw 139. The adjusting screw 139 is mounted in a vertical bore in a block 140 secured to the side plate 69 of the lower frame 65. A stop nut 141 on the screw 139 rests on the top surface of the block 140 and permits vertical adjustment of the plate 137 which in turn provides vertical adjustment of the chain which rides on the top edge of the shoe which is carried on the cross bars attached to the plate 137. A corresponding adjusting mechanism is provided at both sides of each of the conveyors 117 and 118 for adjusting the path of the opposed runs of the two conveyors so as to adjust the pressure between the sealing irons 115 and 116. The sealing irons 115 and 116 are spaced on the lower and upper sealing conveyors and the latter are adjusted so that the bars 115 and 116 co-operate to engage the web on opposite sides thereof between a pair of the gripper bars 82, 106 and the next succeeding gripper rollers 87 and 107.

The various operating mechanisms are driven from the motor 17 (FIGURE 1) through the speed change device 18. The speed change device 18 has an output sprocket 145 which is connected by drive chain 146 with the sprocket 147 on a transversely extending drive shaft 148 journaled in the side members of the suport frame 11. A gear 149 (FIGURE 8) on the shaft 148 drives a gear 150 on an adjoining cross shaft 151 which is journaled in brackets 152 on the frame 11 and carries gear 153 and sprocket 154 axially spaced thereon. The gear 153 drives a gear 155 on a cross shaft 156 journaled in the side plates 51 and 51' of the web feeding mechanism. The gear 155 drives the gear 157 on the one end of the shaft 50 which carries the one feed roll 49. The shaft 156 also has a sprocket 158 which is connected by a chain 159 with a sprocket 160 mounted on a stub shaft 161 which is supported in a vertically adjustable bracket plate 162 mounted on the side frame plate 31' of the perforating mechanism 15. Chain 159 engages a sprocket 163 on the cross shaft 33 which carries the anvil roll 32. The anvil roll shaft 33 and the perforating roll shaft 29 are connected in driving relation by the gears 164 and 165. The sprocket 154 on the cross shaft 151 is connected by chain 166 with a sprocket 167 on the drive shaft 76 of the lower conveyor 71 on the conveyor frame 65. The shaft 76 carries a gear 168 which engages with the gear 169 on the upper shaft 67 so as to drive the two conveyors 71 and 72 in synchronism. The shafts 76 and 67 also carry sprockets 170 and 171 which are connected in driving relation by the chains 172 and 173 with sprockets 174 and 174' on the ends of the drive shafts 123 and 123' for driving the sealing iron conveyors 117 and 118.

A take-off mechanism 180 (FIGURES 1, 2 and 8) is provided at the ends of the conveyor frames 65 and 66. The take-off mechanism 180 comprises a pair of draw rolls 181 and 182 mounted on cross shafts 183 and 184 which are supported in vertically disposed side plates 185 and 185'. The upper draw roll 181 may be supported in the same manner as the upper feed roll 48 at the infeed end of the conveyors so as to facilitate threading and adjustment of the pressure between the two draw rolls. The lower feed roll 182 has the shaft 184 extended so as to receive a gear 186 which engages with a gear 187 extending from a right angled gear connector 188 which is supported on a bracket 189 at the one side of the machine and connected to the end of a long drive rod 190 extending longitudinally on the back side of the machine and supported by bearing brackets 191. The shaft 190 is connected at its other end to a right angled gear connector 192 which is coupled to the end of the cross shaft 50 carrying the lower infeed roll 49 so that the infeed and outfeed are driven at the same speed.

The upper conveyor frame 66 is mounted for vertical swinging movement above the lower conveyor frame 65 about the axis of the transverse shaft 67 so as to permit ready separation of the web sealing and gripping members while the machine is in operation. A pair of hydraulic cylinders 193 and 193' are mounted in an identical manner on opposite sides of the conveyor frames 65 and 66. Each of the cylinders 193 and 193' is pivotally connected at 194 to a supporting bracket 195 mounted on the frame 11 and has its piston 196 pivotally connected at 197 to a bracket 198 attached to the side plate of the upper conveyor frame 66 so that when the cylinders 193 and 193' are actuated the frame 66 is pivoted about the axis of the shaft 67 to a raised position which separates the gripper bars and gripper rollers on the two conveyors 71 and 72 as well as the sealing bars 115 and 116 on the sealing conveyors 117 and 118. A U-shaped bracket 200 is mounted on a cross bar 201 at the discharge end of the conveyor frame 66 so that when the frame 66 is pivoted upwardly the web W will be lifted a sufficient distance to clear the sealing bars in the lower sealing conveyor 117. With this arrangement the upper conveyor frame 66 may be raised while the machine is in operation and the sealing bars 115 and 116 will be separated so as to avoid any burning of the web. Fans 202 may be mounted on the cover plate 203 on the top conveyor frame 66 for directing cooling air onto the web as it passes beneath the same. Additional fans (not shown) are mounted beneath the lower conveyor opposite the top fans. These fans direct cooling air upwardly onto the underside of the web as it passes above the same thereby cooling the seals from both sides. Interengaging stop bars 204 and 205 are provided on corresponding side plates of the two conveyor frames 65 and 66 to insure proper positioning of the upper frame 66 relative to the lower frame 65 when the upper frame is lowered into operative position.

Figures 10, 11:
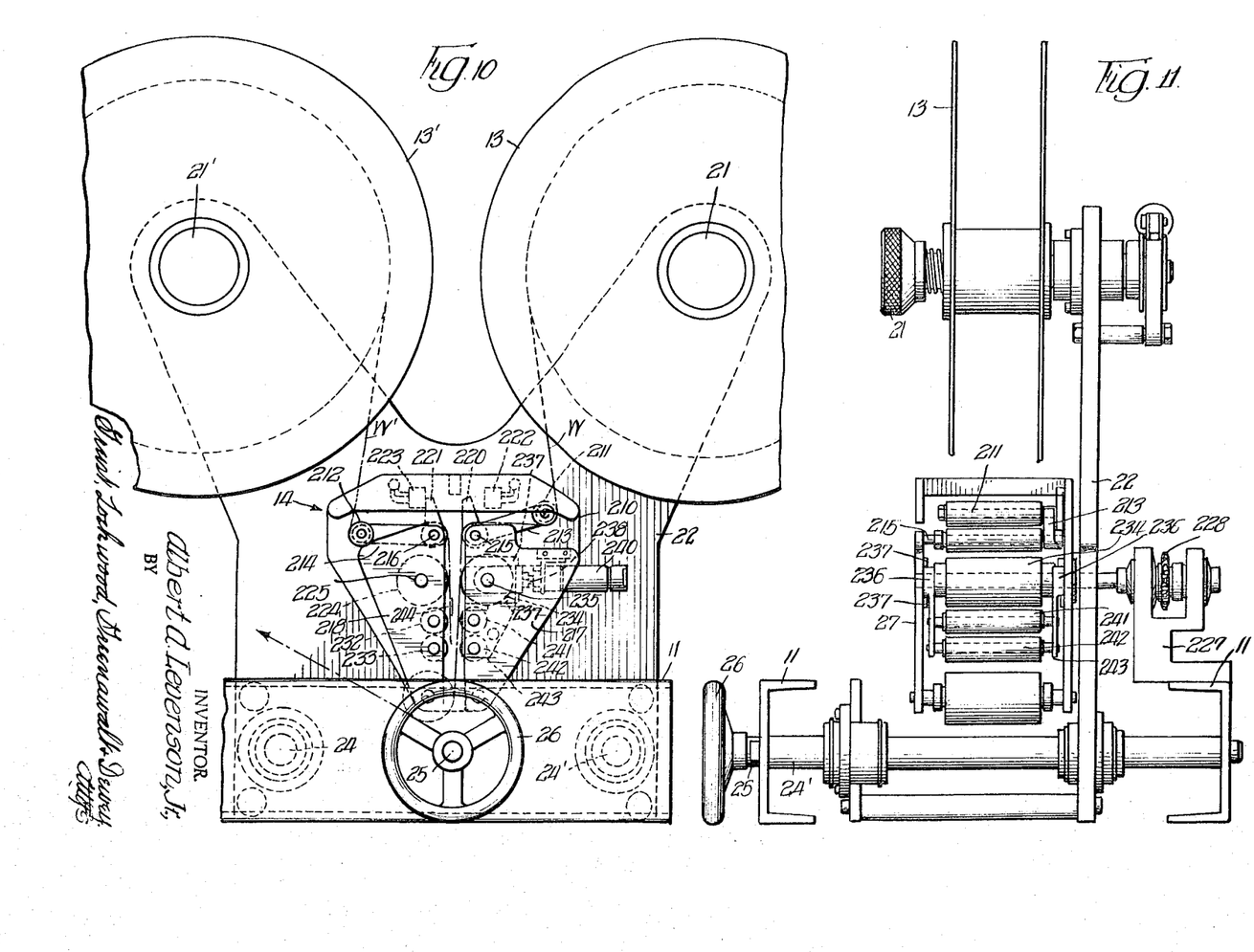
FIGURE 10 is a front side elevation, to an enlarged scale, showing the web splicing apparatus employed on the machine.
FIGURE 11 is an end elevation showing the web splicing apparatus.

To enable continuous operation of the machine and eliminate any need for stopping the operation when a reel of stock material is exhausted, a web splicing apparatus 14 is provided below the reels 13 and 13'. The web splicing apparatus 14 (FIGURES 10 and 11) is mounted on a vertically disposed base plate 210 which is generally triangular in shape and which is supported on the front face of the bracket 23 beneath the reel supports 21 and 21'. The apparatus in the position shown in FIGURE 10 is adjusted to feed the web W from the reel 13 while the leading end of the reserve web W' is in position for splicing when the web W is exhausted from the reel 13. The apparatus comprises entry or lead-in rollers 211 and 212 which are mounted on support arms 213 and 214 pivotally mounted at 215 and 216 between the base plate 210 and a pair of vertically disposed, parallel front plates 217 and 218. The arms 213 and 214 carry tail pieces 220 and 221 and the latter members are adapted to engage or disengage in operative relation switches 222 and 223. The switches 222 and 223 are mounted with their operating buttons in the path of movement of the tail pieces 202 and 221 when the rollers 211 and 212 are lifted by tension in the webs W and W', respectively. At the start of the operation the roller 211 is lifted by the web W so as to break the contact with the switch 222 while the roller 212 is in the normal non-operative down position due to the lack of tension in the web W' and the switch 223 is closed. A draw roll 224 is mounted on a shaft 225 below the pivot point 216. The shaft 225 extends through the base plate 210, and the vertical reel support plate 23 and has a sliding key connection with a hollow drive shaft 226 journaled in the upstanding arms of a U-shaped bearing bracket 227 mounted at the rear of the plate 23. The hollow shaft or sleeve 226 carries a sprocket 228 which is connected by a drive chain 230 with the sprocket 231 on the shaft 156 so as to continuously drive the roller 224. A pair of pressure rollers 232 and 233 are mounted in freely rotatable and vertically aligned relation below the driven roller 224 so as to provide a vertical path for the web below the driven roller 224. On the other side of the apparatus a co-operating feed roll 234 is mounted on a shaft 235 which is journaled in the side arms of a U-shaped supporting frame 236. The frame 236 is mounted for horizontal sliding movement in vertically spaced gibs 237 and connected to the end of piston 238 of an air cylinder 240. The air cylinder 240 is mounted on a suitable bracket at the side of the base plate 210. A pair of pressure rollers 241 and 242 are mounted on brackets 243 extending below the bracket 236. These rollers are vertically aligned and mounted for free rotation in oppositely disposed relation to the rollers 232 and 233. The air cylinder 240 is controlled by an electrically operated air valve through a timer circuit which includes the switches 222 and 223.

In the operation of the web splicing apparatus 14 the free end of the web W' is provided with a transverse strip of sticky tape 244 and remains in the position shown in FIGURE 10 until the web W, which is feeding, is exhausted from the reel 13 and the tension in this web is relieved. When the tension is relieved the roll 211 drops and closes the switch 222 which actuates the valve controlling the cylinder 240 so as to move the roller carrying frame 236 to the left in FIGURE 10 and bring the feed roll 234 into engagement with the driven feed roll 224. This clamps the web W and the end of the web W' between the roller 224 and 234 and starts the feed of the web W', the sticky tape 244 serving to hold the two webs together as the leading and trailing portions thereof progress through the machine. The operation of the valve 240 is timed so as to retract the roll 234 after a predetermined amount of the new web W' has been fed into the machine. The exhausted reel 13 may then be removed from the support 21 and a new reel with a new supply of the web put in place. The end of the new web is threaded over the rolls 211 and 215 and between the rolls 224 and 234 in the same manner as shown for web W' in FIGURE 10 whereupon the webs will be automatically spliced when the web W' is exhausted.

I claim:

1. A container fabricating machine comprising means for advancing a flattened tubular heat sealable material, means for perforating said material on transverse lines so as to divide the same into container forming lengths, a pair of co-operating endless conveyors having longitudinally spaced, transverse gripper bar members thereon for engaging successive container forming lengths of the material on opposite sides and carrying the same along a lineal path, and a pair of co-operating endless conveyors having longitudinally spaced, transversely extending heated sealing irons movable into clamping position on opposite sides of said lengths of material while the lengths of material are engaged by said gripper bars and carried along said lineal path for forming transverse seals at the ends of said sections, and means co-operating with the gripper bar members for engaging each successive length of material between successive pairs of gripper bars and for advancing the leading portion of the material relative to the trailing portion thereof so as to relieve the longitudinal tension in the area which is engaged by the sealing irons.

2. A container fabricating machine comprising means for advancing a flattened tubular heat sealable material, means for perforating said material on transverse lines so as to divide the same into container forming lengths, a pair of co-operating endless conveyors having longitudinally spaced, transverse gripper bar members thereon for engaging successive container forming lengths of the material on opposite sides and carrying the same along a lineal path, and a pair of co-operating endless conveyors having longitudinally spaced, transversely extending heated sealing irons movable into clamping position on opposite sides of said lengths of material while the lengths of material are engaged by said gripper bars and carried along said lineal path for forming transverse seals at the ends of said sections, and means for engaging each successive length of material between successive pairs of gripper bars and for moving a leading portion of the web material relative to said pairs of gripper bars so as to relax said leading portion and relieve an area thereof which is disposed for engagement by the sealing irons free of any longitudinal tension.

3. A container fabricating machine comprising means for advancing a flattened tubular heat sealable material, means for perforating said material on transverse lines so as to divide the same into container forming lengths, a pair of co-operating endless conveyors disposed horizontally one above the other with runs between which the material is advanced, said conveyors having longitudinally spaced, transverse gripper bar members thereon for engaging successive container forming lengths of the material on opposite sides and carrying the same along a lineal path, and co-operating transversely extending heated sealing irons movable into clamping position on opposite sides of said lengths of material while the lengths of material are engaged by said gripper bars and carried along said lineal path for forming transverse seals at the leading ends of said sections, and means co-operating with the gripper bar members for engaging each successive length of material between successive pairs of gripper bars and for moving the leading portion of each length sufficiently ahead relative to the trailing portion thereof so as to relieve the longitudinal tension in the area which is engaged by the sealing irons.

4. A container fabricating machine comprising draw rolls for advancing a flattened tubular heat sealable material, means for perforating said material on longitudinally spaced, transverse lines so as to divide the same into container forming lengths, a pair of co-operating endless conveyors having longitudinally spaced, transverse gripper bar members thereon for engaging successive container forming lengths of the material on opposite sides and carrying the same along a lineal path, co-operating transversely extending heated sealing irons movable into clamping position on opposite sides of said lengths of material while the lengths of material are engaged by said gripper bars and carried along said lineal path for forming transverse seals in said sections, and gripper rollers co-operating with the gripper bar members for engaging each successive length of material between successive pairs of gripper bars and means for rotating the gripper rollers so as to move a portion of the web material relative to an adjoining portion thereof and relieve the longitudinal tension in the area which is engaged by the sealing irons.

5. Apparatus for forming a plurality of connected bags in flattened condition from a stock material in the form of a flattened tube of heat sealable film material which apparatus comprises, means for feeding the flattened tube from a supply roll, means for applying longitudinally spaced, transversely extending lines of perforations in the flattened tube so as to divide the same into bag forming sections each separated from the adjoining section by a line of perforations, a pair of parallel conveyor frames extending generally horizontal, a pair of parallel gripping conveyors mounted in said frames with confronting runs thereof extending between the frame so as to receive the bag forming flattened tube material which is advanced by said feeding means, co-operating transversely extending clamp-type grippers on said conveyors which are arranged to move into tube gripping spaced relation along said confronting runs, co-operating transversely extending gripper rollers mounted on said conveyors which are arranged to move into tube gripping relation between said clamp-type grippers, means for turning the gripper rollers to advance a leading portion of the tube section between each successive pair of clamp-type grippers relative to the adjoining portion of said tube section so as to relieve the longitudinal tension in the tube material, a pair of parallel heat sealing conveyors mounted on said frames and having co-operating transversely extending pairs of heat sealing irons arranged to engage in heat sealing relation on opposite sides of the leading portions of the tube sections between each pair of gripping rollers and the adjacent pair of clamp-type grippers preceding the same so as to seal the tube on transverse lines adjacent the transverse lines of perforations.

6. Apparatus for forming a plurality of connected bags in flattened condition from a stock material in the form of a flattened tube of heat sealable film material which apparatus comprises, means for feeding the flattened tube from a supply roll, means for applying longitudinally spaced, transversely extending lines of perforations in the flattened tube so as to divide the same into bag forming sections each separated from the adjoining section by a line of perforations, a pair of conveyor frames extending in generally horizontal, superimposed relation, a pair of gripping conveyors mounted in said frames with confronting runs thereof extending horizontally between the frames so as to receive the bag forming flattened tube material as it is advanced by said feeding means, co-operating transversely extending gripper bars on said conveyors which are arranged to move in to tube gripping spaced relation along said confronting runs, co-operating, transversely extending, rotatably mounted gripper members on said conveyors which are arranged to move into tube gripping relation between said gripper bars, means for turning the rotatably mounted gripper members to advance a leading portion of the tube section between each successive pair of gripper bars so as to relieve the longitudinal tension in the leading portion of the tube section, a pair of heat sealing conveyors mounted on said frames and having co-operating transversely extending heat sealing irons arranged to engage in seam forming relation on opposite sides of the leading portions of the tube sections between each pair of gripper members and the next succeeding pair of gripper bars.

7. Apparatus for forming a plurality of connected bags in flattened condition from a stock material in the form of a flattened tube of heat sealable film material which apparatus comprises, means for feeding the flattened tube from a supply roll, means for applying longitudinally spaced, transversely extending lines of perforations in the web so as to divide the same into bag forming sections each separated from the adjoining section by a line of perforations, a pair of elongate conveyor frames extending in generally horizontal superimposed relation, the top conveyor frame being hingedly mounted at the entrance end thereof so that its exit end may be swung upwardly to separate the frames, a pair of gripping conveyors mounted in said frames with confronting runs thereof extending longitudinally between the frames so as to receive bag forming flattened tube material as it is advanced by said feeding means, co-operating transversely extending gripper bars on said conveyors which are arranged to move into paired tube gripping spaced relation along said confronting runs, co-operating transversely extending, rotatably mounted gripper members mounted on said conveyors which are arranged to move into paired tube gripping relation between said gripper bars, means for turning the rotatable gripper members to stretch a trailing portion of the tube section between each successive pair of gripper bars and relieve the longitudinal tension in the leading portion of the tube section, a pair of parallel, longitudinally extending, heat sealing conveyors mounted on said frames and having co-operating transversely extending heat sealing bars arranged to engage in heat sealing relation on opposite sides of the leading portions of the tube sections between each pair of gripper bars and the next succeeding pair of gripper bars, and means for swinging the top conveyor frame to separate the conveyors and move the heat sealing bars carried thereon out of tube engaging relation.

8. A machine for fabricating bags of heat sealable material which comprises an upright frame, a support at one end of the frame for receiving a roll of heat sealable stock material in flattened continuous tube form, a pair of draw rolls mounted on the frame for advancing the flattened tube, a pair of perforating rolls mounted on the frame adjacent the draw rolls for transversely perforating the tube at longitudinally spaced intervals to divide the same into successive bag forming sections, tube gripping and sealing conveyor assemblies mounted on said frame with longitudinal runs thereof in opposed relation for advancing the tube in a horizontal path and transversely sealing the tube adjacent the transverse perforations therein, said tube gripping and sealing assemblies having longitudinally spaced, transversely extending pairs of co-operating tube clamping members, longitudinal spaced members for advancing leading portions of each tube section relative to the remainder of each section so as to relieve the tension in the sealing area and heat sealing members, said tube clamping members, said longitudinally spaced member sand said heat sealing members being arranged in reverse order in the direction of advance of the tube.

9. A machine for fabricating bags of heat sealable material which comprises an upright frame, a support at one end of the frame for receiving a roll of stock material in the form of a flattened continuous tube of heat sealable film material, a pair of draw rolls mounted on the frame for advancing the flattened tube, a pair of perforating rolls mounted on the frame for transversely perforating the tube at longitudinally spaced intervals to divide the same into successive bag forming sections, tube gripping and sealing conveyor assemblies mounted in superimposed relation on said frame with longitudinal runs thereof in oppositely facing relation and having means for gripping the tube so as to advance it in a horizontal path and for transversely sealing the tube adjacent the transverse perforations therein, said tube gripping and sealing assemblies having longitudinally spaced, transversely extending pairs of co-operating tube engaging members for gripping successive sections of the tube and for advancing leading portions of each section relative to the trailing portions thereof so as to relieve longitudinal tension in the leading portion of each section thereof and heat sealing members arranged for engaging the tube in the areas in which the tension is relieved.

10. A machine as recited in claim 9, having means for adjusting the travel of the tube so as to vary the point of contact of the perforating rolls.

11. A machine for fabricating bags of heat sealable material which comprises an upright frame, a pair of supports at one end of the frame for receiving a pair of rolls of stock material in flattened continuous tube form, a splice forming device associated with said roll supports and having means for automatically splicing the leading end of a new roll to the trailing end of an exhausted roll of the stock material, a pair of draw rolls mounted on the frame for advancing the flattened tube, a pair of perforating rolls mounted on the frame for transversely perforating the tube at longitudinally spaced intervals to divide the same into successive bag forming sections, tube gripping and sealing conveyor assemblies mounted on said frame and having longitudinal runs thereof in opposed relation for advancing the tube in a horizontal path and transversely sealing the tube adjacent the transverse perforations therein, said tube gripping and sealing assemblies having longitudinally spaced, transversely extending pairs of co-operating tube gripping members, means for moving certain of said gripping members relative to others for relieving longitudinal tension in a portion of each bag forming section and heat sealing members arranged to engage the tube between said gripping members and to seal the same in the non-tensioned area of each section.

12. A machine for fabricating bags as recited in claim 11, said machine having a supporting frame for said roll supports and said splice forming device which is adjustable laterally of the machine.

13. A machine for fabricating bags of heat sealable material which comprises an upright frame, means at one end of the frame for supporting a roll of stock material in flattened continuous tube form, a pair of draw rolls mounted on the frame for advancing the flattened tube, a pair of perforating rolls mounted on the frame for transversely perforating the tube at longitudinally spaced intervals to divide the same into successive bag forming sections of uniform length, tube gripping and sealing conveyor assemblies mounted in superimposed relation on said frame with longitudinal runs thereof in opposed relation for advancing the tube in a horizontal path and transversely sealing the tube adjacent the transverse perforations therein, said tube gripping and sealing assemblies having longitudinally spaced, transversely extending pairs of co-operating tube engaging members, means for moving certain of said tube engaging members on the conveyor assemblies so as to advance a portion of each section relative to an adjoining portion and thereby relieve longitudinal tension in each tube section, and transverse heat sealing members arranged to form seals in each tube section.

14. A machine as recited in claim 13, and having fans mounted to blow air on the transverse heat seals as they advance through the machine.

15. A bag fabricating machine comprising an upright support frame, elongate conveyor frames mounted on said support frame and having tube gripping and sealing conveyors extending in vertically aligned, horizontally disposed relation thereon, said tube gripping and sealing conveyors being arranged with vertically aligned, oppositely disposed lower and upper runs between which bag forming flattened tube material is advanced and transversely extending, co-operating pairs of tube gripping and heat sealing members extending in longitudinally spaced relation along said conveyors, each pair of heat sealing members being arranged to engage on opposite sides of the tube material between successive pairs of tube gripping members and rotate relative to each other so as to stretch the tube and relieve the tension in the areas engaged by the heat sealing members, pairs of draw rolls at each end of the conveyor frames for advancing the tube material between the gripping and sealing conveyors, a pair of perforating rolls at the entrance end of the gripping and sealing conveyors for transversely perforating the tube material at intervals and means for adjusting the longitudinal travel of the tube material so as to vary the longitudinal position of the transverse perforations.

16. A bag fabricating machine comprising an upright support frame, elongate conveyor frames mounted on said support frame and having tube gripping and sealing conveyors extending in superimposed vertically aligned, horizontally disposed relation thereon, said tube gripping and sealing conveyors comprising laterally spaced chains arranged with oppositely disposed lower and upper runs between which bag forming flattened tubular material advances and transversely extending co-operating pairs of tube gripping and heat sealing members extending between said laterally spaced chains in longitudinally spaced relation along said conveyors, each pair of heat sealing members being arranged to engage on opposite sides of the tube material between successive pairs of tube gripping members and alternate pairs of said tube gripping members comprising roller members rotatably mounted at opposite ends on the conveyor chains, lever arms at each end of the roller members and cam rollers on the free ends of the lever arms, cam plates for engaging the cam rollers to turn the tube gripping rollers so as to exert a pull on the tube material and relieve the longitudinal tension in the areas engaged by the heat sealing members, a pair of draw rolls at the entrance end of the conveyor frames for advancing the tube material between the gripping and sealing conveyors, a pair of rolls at the entrance end of the gripping and sealing conveyors for forming a transverse tear line in the tube material at intervals and means for adjusting the longitudinal travel of the tube material so as to adjust the longitudinal position of the transverse tear line.

17. A bag fabricating machine comprising an upright support frame, a pair of elongate conveyor frames mounted on said support frame and having gripping and sealing conveyors extending in vertically aligned, horizontally disposed relation thereon, said gripping and sealing conveyors being arranged with oppositely disposed lower and upper runs between which bag forming material is advanced, transversely extending co-operating pairs of gripping and sealing bar members extending in longitudinal spaced relation along said conveyors, each pair of heat sealing bar members being arranged to engage on opposite sides of the bag forming material between successive pairs of gripping bar members and cam operated means to rotate alternate pairs of said gripping bar members relative to each other so as to exert a pull on portions of the bag forming material and relieve the tension in the areas engaged by the heat sealing members, a pair of draw rolls at the one end of the conveyor frames for advancing the bag forming material between the oppositely disposed runs of the gripping and sealing conveyors, means at the entrance end of the gripping and sealing conveyors for transversely weakening the bag forming material at intervals so as to form spaced lines of separation and means for adjusting the longitudinal travel of the bag forming material so as to adjust the longitudinal position of the transverse separation lines.

18. A machine for fabricating bags from a continuous tube of flexible film material which is in flattened web form, said machine comprising a web supporting conveyor means, means for advancing the flattened tubular web onto said supporting conveyor means, means for gripping the web at longitudinally spaced points so as to hold the same on said supporting conveyor means, means for engaging a portion of the web between said spaced points and for moving the same out of its normal path so as to provide a sealing area, which is free of any longitudinal tension, and means for transversely sealing the web in said tension free area while the web is held on said supporting conveyor means.

References Cited

UNITED STATES PATENTS 3,053,723   9/1962   Plach et al. __________ 156—515

DOUGLAS J. DRUMMOND, *Primary Examiner.*

U.S. Cl. X.R.

156—583